(No Model.)
C. E. SENNA.
BALL COCK.
No. 547,620. Patented Oct. 8, 1895.
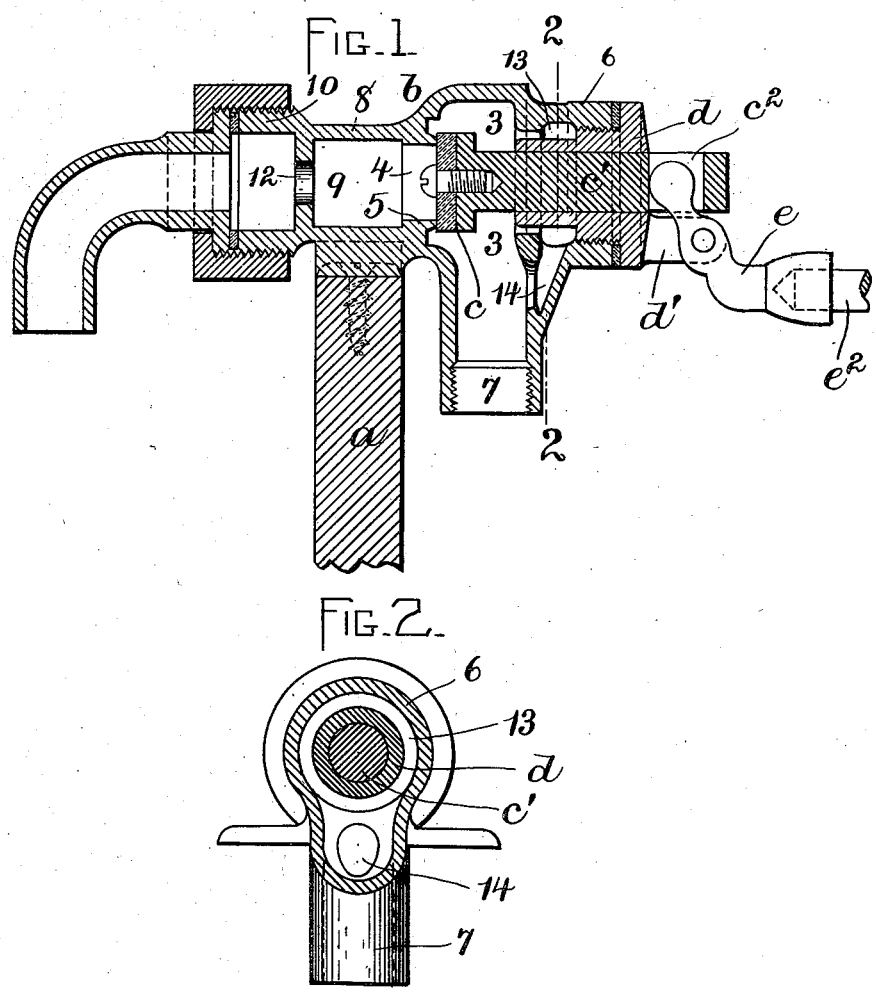
WITNESSES:
A. D. Harrison.
Rollin Abell.
INVENTOR:
Charles E. Senna
by Wright, Brown + Quimby
Attys.

UNITED STATES PATENT OFFICE.

CHARLES E. SENNA, OF SOUTH FRAMINGHAM, ASSIGNOR TO GILCHRIST & TAYLOR, OF BOSTON, MASSACHUSETTS.

BALL-COCK.

SPECIFICATION forming part of Letters Patent No. 547,620, dated October 8, 1895.

Application filed March 29, 1895. Serial No. 543,661. (No model.)

*To all whom it may concern:*

Be it known that I, CHARLES E. SENNA, of South Framingham, in the county of Middlesex and State of Massachusetts, have invented certain new and useful Improvements in Ball-Cocks, of which the following is a specification.

This invention relates to that class of cocks or valves for controlling the admission of water into supply-tanks in which a valve is connected with a pivoted lever having a float supported by the water in the tank, the float rising and falling with the water and opening a valve when the water falls to a predetermined level and closing the valve when the water rises to another predetermined level.

The invention has for its object to provide certain improvements in cocks of this class, whereby their operation is made more satisfactory and efficient; and to this end the invention consists in the improvements which I will now proceed to describe and claim.

Of the accompanying drawings, forming a part of this specification, Figure 1 represents a longitudinal section of a ball-cock embodying my improvements. Fig. 2 represents a section on line 2 2 of Fig. 1.

The same letters and numerals of reference indicate the same parts in both the figures.

In the drawings, $a$ represents a water-tank which is supplied with water by the improved cock hereinafter described, said tank having an outlet from which water is drawn from time to time.

$b$ represents the main portion or casing of my improved cock, which is secured in any suitable way to the tank and preferably to the upper edge thereof, as shown in Fig. 1. Said casing comprises a central chamber 3, an inlet 4, communicating with one end of said chamber and surrounded by a valve-seat 5, an internally-screw-threaded extension 6, projecting from the end of the chamber opposite the valve-seat, a lateral outlet 7, extending downwardly from the chamber and adapted to discharge water into the tank, and an extension 8, formed on the end of the chamber opposite the extension 6 and containing a chamber 9, which communicates with the inlet 4, said extension having an externally-threaded portion 10 and a reduced inlet 12 of smaller diameter than the chamber 9 and inlet 4.

$c$ represents a valve having a stem $c'$ and arranged to open and close the valve-seat 5. $d$ represents a nut having a central perforation formed to receive the valve-stem $c'$, said nut being externally threaded and formed to engage the thread in the extension 6. The inner portion of the nut $d$ is reduced in diameter, so that an annular space or chamber 13 is formed between the interior of the extension 6 and the reduced portion of the nut $d$, said annular chamber communicating with the chamber 3.

The casing $b$ is provided with a passage 14, connecting the annular chamber 13 with the outlet 7, the arrangement being such that water flowing through said outlet draws the water from the annular chamber 13 away from the screw-thread connection between the nut $d$ and extension 6, thus preventing the existence of pressure tending to cause leakage of water between said nut and extension.

$e$ represents a lever which is pivoted at $e'$ to ears $d'$ formed on the nut $d$. One arm of said lever projects into a slot $c^2$ in the valve-stem $c'$, the other arm of said lever being extended in the form of a rod $e^2$, to the outer end of which is connected a float $e^3$, adapted to be supported by the accumulation of water in the tank. When the water rises the lever $e$ is moved to close the valve, and when the water falls the lever is moved to open the valve, as will be readily seen.

$f$ represents a supply or inlet pipe, which is connected by a coupling $g$ with the threaded portion 10 of the casing, water passing from said pipe $f$ through the reduced inlet 12, chamber 9, and inlet 4 to the chamber 3, from whence it emerges through the outlet 7 into the tank. The reduced inlet 12 is of smaller diameter than the inlet-pipe $f$, and, as already stated, is of smaller diameter than the chamber 9 and inlet 4. The object of this reduced inlet is to prevent the water from making an objectionable noise in passing through the space between the inlet 4 and the valve when the valve is being closed and said space is being contracted. The reduced inlet so contracts the volume of water that before it reaches the valve it will pass, without noise, between the valve and seat, even when the valve is nearly closed. It should be observed that the valve closes against the water-pressure, and is therefore closed slowly, so that the noise above mentioned would be protracted and objectionable if not prevented by this contracted inlet 12.

It will be seen that the annular chamber 13 and the passage 14 connecting said chamber with the outlet render my improved device less liable to leakage around the nut which supports and guides the valve-stem and thus increases the efficiency of the device.

I claim—

In a ball-cock, the casing having the central chamber, an inlet surrounded by a valve-seat at one end of said chamber, the screw-threaded extension at the other end of the chamber, a lateral outlet between said inlet and extension, and a passage connecting the said extension with the outlet; combined with the perforated nut screwed into said extension and reduced at its inner end to form an annular space between the extension and the nut, said space communicating with the chamber and with the passage, the valve having a stem fitted to slide in the nut, and the float-lever pivoted to the nut and engaged with the valve-stem.

In testimony whereof I have signed my name to this specification, in the presence of two subscribing witnesses, this 21st day of March, A. D. 1895.

CHARLES E. SENNA.

Witnesses:
J. H. ALEXANDER,
JOHN MARTENS.